(12) United States Patent
Hirabayashi et al.

(10) Patent No.: US 8,015,693 B2
(45) Date of Patent: Sep. 13, 2011

(54) METHOD OF MANUFACTURING A THIN-FILM MAGNETIC HEAD HAVING A LOWER MAGNETIC POLE PROJECTION PROJECTING TOWARD AN UPPER MAGNETIC POLE

(75) Inventors: Hiraku Hirabayashi, Tokyo (JP); Yoshiyuki Mizoguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 973 days.

(21) Appl. No.: 11/907,910

(22) Filed: Oct. 18, 2007

(65) Prior Publication Data

US 2008/0094751 A1  Apr. 24, 2008

(30) Foreign Application Priority Data

Oct. 20, 2006  (JP) ................................ P2006-286554

(51) Int. Cl.
*G11B 5/187* (2006.01)
(52) U.S. Cl. ............... 29/603.16; 29/603.15; 29/603.18; 360/125.41
(58) Field of Classification Search ............... 29/603.13, 29/603.14, 603.15, 603.16, 603.18; 216/22; 360/125.41, 125.51, 125.52
See application file for complete search history.

(56) References Cited

U.S. PATENT DOCUMENTS

| 5,567,333 | A | * | 10/1996 | Hira et al. ........................ 216/22 |
| 6,130,809 | A | * | 10/2000 | Santini ................. 360/125.51 X |
| 6,282,776 | B1 | | 9/2001 | Otsuka et al. |
| 2005/0264934 | A1 | | 12/2005 | Oike et al. |

FOREIGN PATENT DOCUMENTS

| JP | 11007613 A * | 1/1999 |
| JP | A-11-3510 | 1/1999 |
| JP | A-11-353614 | 12/1999 |
| JP | A 2000-20915 | 1/2000 |
| JP | A-2004-164755 | 6/2004 |
| JP | A 2005-346786 | 12/2005 |

* cited by examiner

*Primary Examiner* — A. Dexter Tugbang
(74) *Attorney, Agent, or Firm* — Oliff & Berridge, PLC

(57) ABSTRACT

A method of forming a thin-film magnetic head comprises a lower magnetic pole layer forming step of forming a lower magnetic pole layer; a lower magnetic pole projection forming step of forming the lower magnetic pole layer with a lower magnetic pole projection; a gap layer forming step of laminating a nonmagnetic gap layer on the lower magnetic pole projection; and an upper magnetic pole forming step of forming an upper magnetic pole on the nonmagnetic gap layer. The lower magnetic pole projection forming step forms the lower magnetic pole projection by simultaneously etching an area including parts adjacent to a part to become the lower magnetic pole projection on both sides in a track width direction and a part adjacent to the part to become the lower magnetic pole projection on the side opposite from a medium-opposing surface in a surface of the lower magnetic pole layer.

3 Claims, 12 Drawing Sheets

METHOD OF MANUFACTURING A THIN-FILM MAGNETIC HEAD HAVING A LOWER MAGNETIC POLE PROJECTION PROJECTING TOWARD AN UPPER MAGNETIC POLE

BACKGROUND OF THE INVENTION

1. Field of the Invention

The present invention relates to a method of manufacturing a thin-film magnetic head and a thin-film magnetic head.

2. Related Background Art

Thin-film magnetic heads have been in use as read/write heads for data storage devices such as magnetic tape drives using magnetic tapes and hard disk drives using magnetic disks.

The write part of such a thin-film magnetic head performs writing to a magnetic tape or magnetic disk by a magnetic field formed between a planar lower magnetic pole layer and an upper magnetic pole arranged so as to oppose the lower magnetic pole layer through a nonmagnetic gap layer interposed therebetween.

As disclosed in Japanese Patent Application Laid-Open Nos. 2000-20915 and 2005-346786, it has been known that write characteristics improve when the lower magnetic pole layer is provided with a narrow lower magnetic pole projection extending toward the upper magnetic pole in response to the fact that the upper magnetic pole is narrowed in the track width direction as seen from the medium-opposing surface.

The lower magnetic pole layer is formed with the lower magnetic pole projection by a method of partly etching the lower magnetic pole layer while using the upper magnetic pole as a mask; a method of forming a resist frame on the lower magnetic pole layer and laminating a projection of the lower magnetic pole, the gap layer, and the upper magnetic pole within the resist frame; and the like.

SUMMARY OF THE INVENTION

For further improving recording characteristics, it has been required to reduce the throat height TH, i.e., the distance from the medium-opposing surface to a position where the gap between the two magnetic poles begins to expand in the part in which the upper magnetic pole and the lower magnetic pole projection oppose each other through the nonmagnetic gap layer.

In this case, for increasing the recording magnetic field intensity and so forth, the length of the lower magnetic pole projection in a direction perpendicular to the medium-opposing surface may be made shorter than the length of the upper magnetic pole in the direction perpendicular to the medium-opposing surface, so as to define the throat height TH.

However, the prior art carries out the step of forming the lower magnetic pole projection as mentioned above, which makes it necessary to perform the step of defining the length of the lower magnetic pole projection in the direction perpendicular to the medium-opposing surface separately from the step of defining the width of the lower magnetic pole projection in the track width direction, whereby manufacturing efficiency seems to be low.

In view of the problems mentioned above, it is an object of the present invention to provide a method by which a thin-film magnetic head having a favorable write characteristic is manufactured efficiently, and a thin-film magnetic head manufactured thereby.

The method in accordance with the present invention comprises a lower magnetic pole layer forming step of forming a lower magnetic pole layer; a lower magnetic pole projection forming step of forming the lower magnetic pole layer with a lower magnetic pole projection; a gap layer forming step of laminating a nonmagnetic gap layer on the lower magnetic pole projection; and an upper magnetic pole forming step of forming an upper magnetic pole on the nonmagnetic gap layer.

The lower magnetic pole projection forming step forms the lower magnetic pole projection by simultaneously etching an area including parts adjacent to a part to become the lower magnetic pole projection on both sides in the track width direction and a part adjacent to the part to become the lower magnetic pole projection on the side opposite from the medium-opposing surface in the surface of the lower magnetic pole layer.

The present invention can define the track width of the lower magnetic pole projection and the throat height at once. Therefore, the process is simplified, whereby the cost can be cut down. Also, the width of the lower magnetic pole projection in the track width direction and the width of the upper magnetic pole in the track width direction can easily be made different from each other.

Preferably, in the upper magnetic pole forming step, the length of the upper magnetic pole in a direction orthogonal to the medium-opposing surface is made greater than the length of the lower magnetic pole projection in the direction orthogonal to the medium-opposing surface. As a consequence, the throat height is reliably defined by the lower magnetic pole projection.

Preferably, the width in the track width direction of the upper magnetic pole formed in the upper magnetic pole forming step is made different from the width of the lower magnetic pole projection in the track width direction.

This can reduce fringing magnetic fields protruding from side parts of the magnetic poles.

The first thin-film magnetic head in accordance with the present invention comprises a lower magnetic pole layer, an upper magnetic pole opposing the lower magnetic pole layer, and a nonmagnetic gap layer provided between the lower magnetic pole layer and the upper magnetic pole.

A lower magnetic pole projection projecting toward the upper magnetic pole is formed on a surface of the lower magnetic pole layer. In the surface of the lower magnetic pole layer, a surface height of an area about the lower magnetic pole projection including parts adjacent to the lower magnetic pole projection on both sides in the track width direction and a part adjacent to the lower magnetic pole projection on the side opposite from the medium-opposing surface is made lower than a surface height of the lower magnetic pole projection. The lower magnetic pole projection and the lower magnetic pole layer directly under the lower magnetic pole projection are integrated with each other without an interface.

This thin-film magnetic head can be manufactured by the above-mentioned manufacturing method.

The second thin-film magnetic head in accordance with the present invention comprises a lower magnetic pole layer, an upper magnetic pole opposing the lower magnetic pole layer, and a nonmagnetic gap layer provided between the lower magnetic pole layer and the upper magnetic pole.

A lower magnetic pole projection projecting toward the upper magnetic pole is formed on a surface of the lower magnetic pole layer. In the surface of the lower magnetic pole layer, a surface height of an area of the lower magnetic pole projection including parts adjacent to the lower magnetic pole projection on both sides in the track width direction and a part adjacent to the lower magnetic pole projection on the side opposite from the medium-opposing surface is made lower than a surface height of the lower magnetic pole projection. In the surface of the lower magnetic pole layer, an outer side part having a surface height higher than that of the area about the lower magnetic pole projection is formed on the outer side of the area about the lower magnetic pole projection.

This thin-film magnetic head can be manufactured by the above-mentioned manufacturing method. It will be sufficient if the etching area is made relatively small.

Preferably, the lower magnetic pole projection and the lower magnetic pole layer directly under the lower magnetic pole projection are integrated with each other without an interface.

It will be preferred in the above-mentioned two thin-film magnetic heads, in the surface of an area surrounding the lower magnetic pole projection, no difference in height exists between the parts adjacent to the lower magnetic pole projection on both sides in the track width direction and the part adjacent to the lower magnetic pole projection on the side opposite from the medium-opposing surface.

Preferably, the length of the lower magnetic pole projection in a direction orthogonal to the medium-opposing surface is shorter than the length of the upper magnetic pole in the direction orthogonal to the medium-opposing surface.

Preferably, the width of the upper magnetic pole in the track width direction in the medium-opposing surface and the width of the lower magnetic pole projection in the track width direction in the medium-opposing surface differ from each other.

DESCRIPTION OF THE PREFERRED EMBODIMENTS

Figure 1:
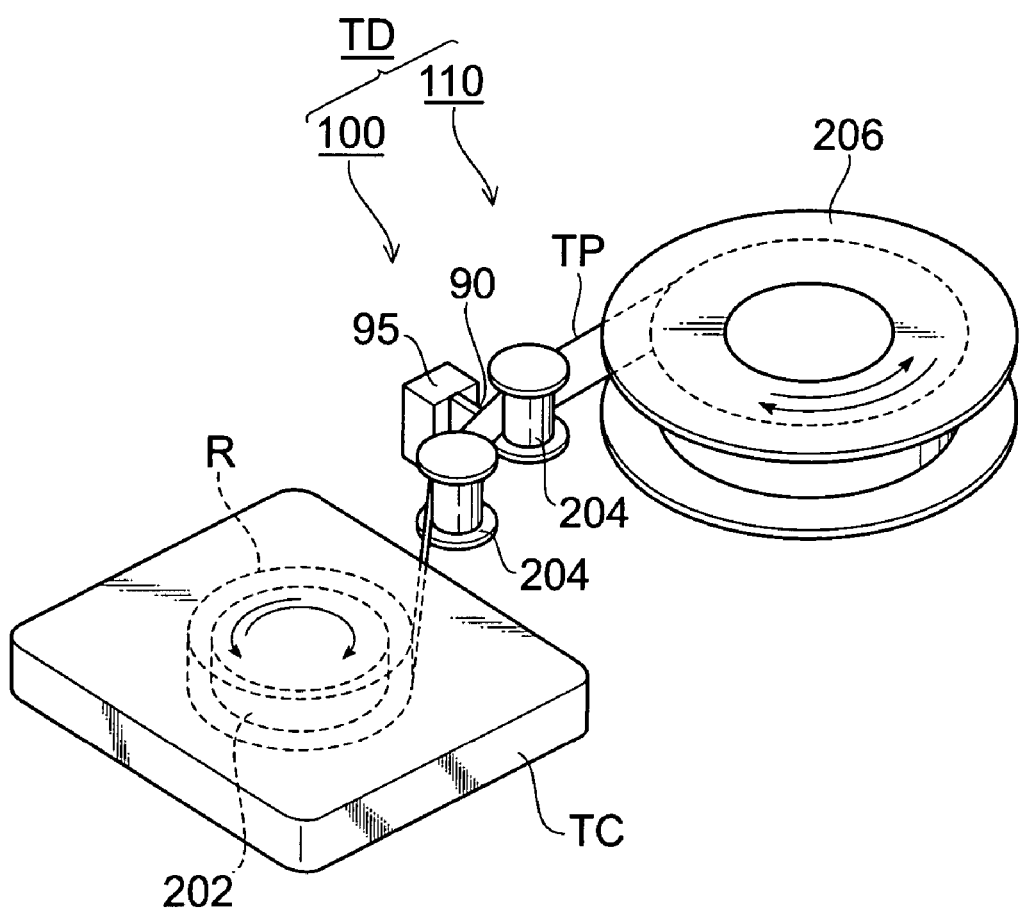
FIG. 1 is a structural view of an example of linear tape drive apparatus in accordance with the present invention.

In the following, embodiments of the thin-film magnetic head in accordance with the present invention will be explained with reference to the accompanying drawings. In this explanation, the same or similar constituents may be referred to with the same numerals or letters while omitting their overlapping descriptions. As shown in FIG. 1, a linear magnetic tape drive TD has a magnetic head apparatus 100, and a magnetic tape driving part 110 for reciprocating a magnetic tape TP along a magnetic-tape-opposing surface (hereinafter referred to as medium-opposing surface) of the magnetic head apparatus 100.

The magnetic tape driving part 110 has a reel driving part 202, to which a tape cassette TC containing a reel R wound with the magnetic tape TP is mounted, for winding the reel R; a plurality of guide rollers 204 for guiding the magnetic tape TP taken out from the tape cassette TC onto the medium-opposing surface of a magnetic head part 90 in the magnetic head apparatus 100; and a reel 206 for taking up the magnetic tape TP.

Though not depicted, the magnetic tape TP is provided with a plurality of data bands in its width direction, while a plurality of tracks are formed within each data band.

The magnetic head apparatus 100, which records information onto the magnetic tape TP and reads information from the magnetic tape TP, comprises the magnetic head part 90 arranged so as to oppose the magnetic tape TP, and a servo part 95 adapted to move the magnetic head part 90 in the width direction of the tape TP.

Figure 2:
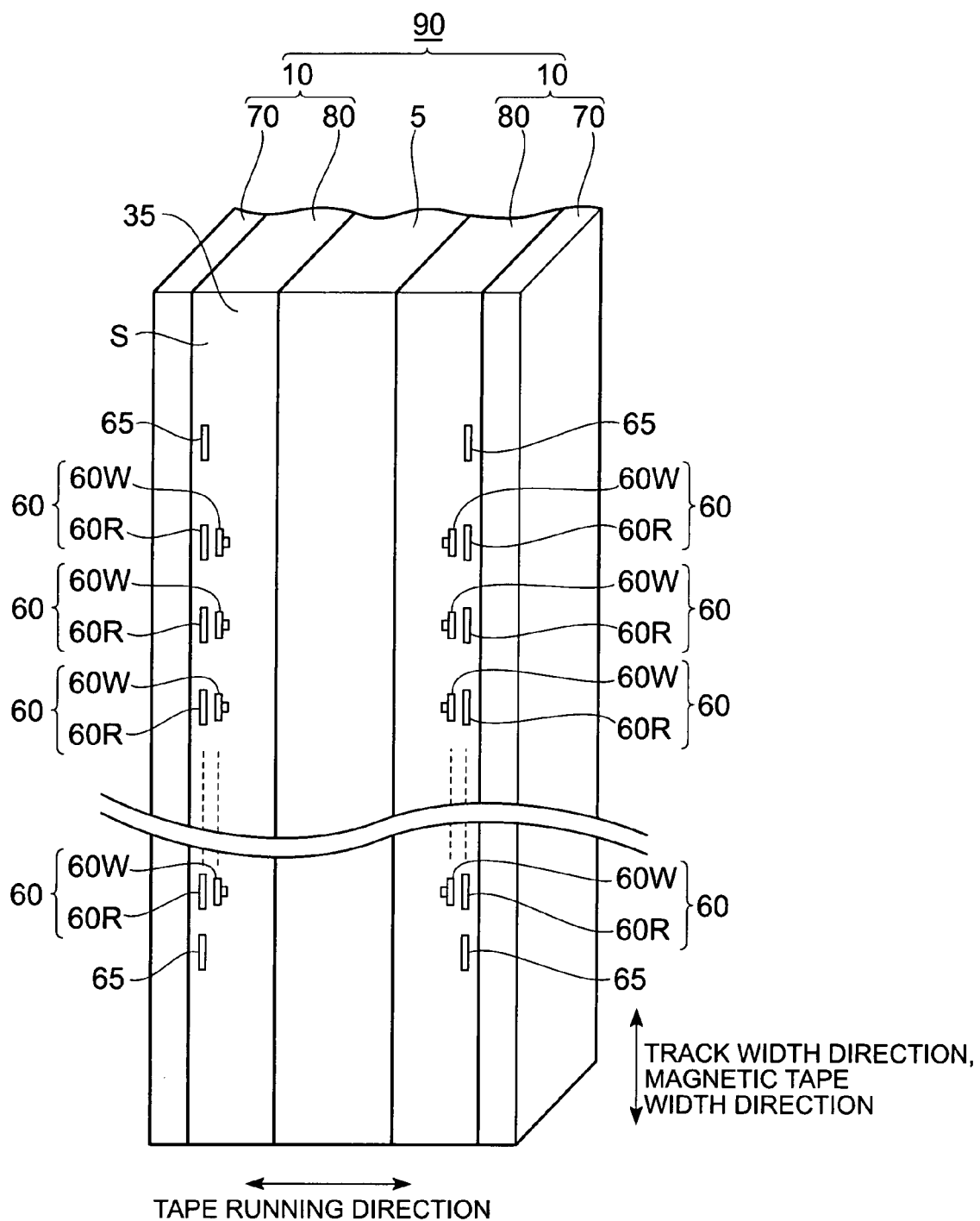
FIG. 2 is a schematic perspective view of an example of magnetic head apparatus in FIG. 1.

As shown in FIG. 2, the magnetic head 90 has bars 10, 10 each including a plurality of thin-film magnetic heads 60 arranged in the width direction of the magnetic tape TP, and a spacer 5 fixed between the bars 10, 10, while the surface on the front side of FIG. 2, i.e., the side face exposing the thin-film magnetic heads 60, is the medium-opposing surface S opposing the magnetic tape TP (medium).

The spacer 5 may be constructed by AlTiC ($Al_2O_3 \cdot TiO_2$), ceramics ($CaTiO_3$ and the like), nonmagnetic materials made of metals having a high hardness, and the like.

Each bar 10 has a structure in which a multilayer body 80 including a plurality of thin-film magnetic heads 60 is laminated on a substrate 70 made of ceramics such as AlTiC. The thin-film magnetic heads 60 are arranged in the tape width direction at intervals corresponding to the respective data tracks within each data band of the magnetic tape TP. Each thin-film magnetic head 60 has a writer 60W for recording information onto the magnetic tape TP, and a reader 60R for reading the information recorded on the magnetic tape TP. The reader 60R and writer 60W are spaced apart from each other in the running direction of the magnetic tape TP. The reader 60W and writer 60R are arranged on the inner and outer sides, respectively, with respect to the spacer 5.

The span of each row of thin-film magnetic heads 60 in the magnetic head part 90 in their aligning direction, i.e., track width direction, is made sufficiently longer than the width of the magnetic tape TP. The structure of the thin-film magnetic heads 60 in each bar 10 will later be explained in detail.

At the time of recording/reproducing, the servo part 95 moves the magnetic head part 90 to a desirable data band in the magnetic tape TP, so that each magnetic head 60 opposes its corresponding track, while the magnetic tape TP is driven by the reels R and 206 so as to run back and forth along the medium-opposing surface S. At each run, information is written by the writers 60W in the bar 10 on the rear side in the running direction and read by the readers 60R in the bar 10 on the front side in the running direction.

Thus, recording and reading operations can be carried out for a plurality of data tracks in each of the forward and backward paths.

Data of servo bands recorded between neighboring data bands in the recording tape are read by a pair of servo signal reading devices 65 provided so as to hold the row of thin-film magnetic heads 60 therebetween, whereby the magnetic head part 90 tracks each data band.

Figure 3:
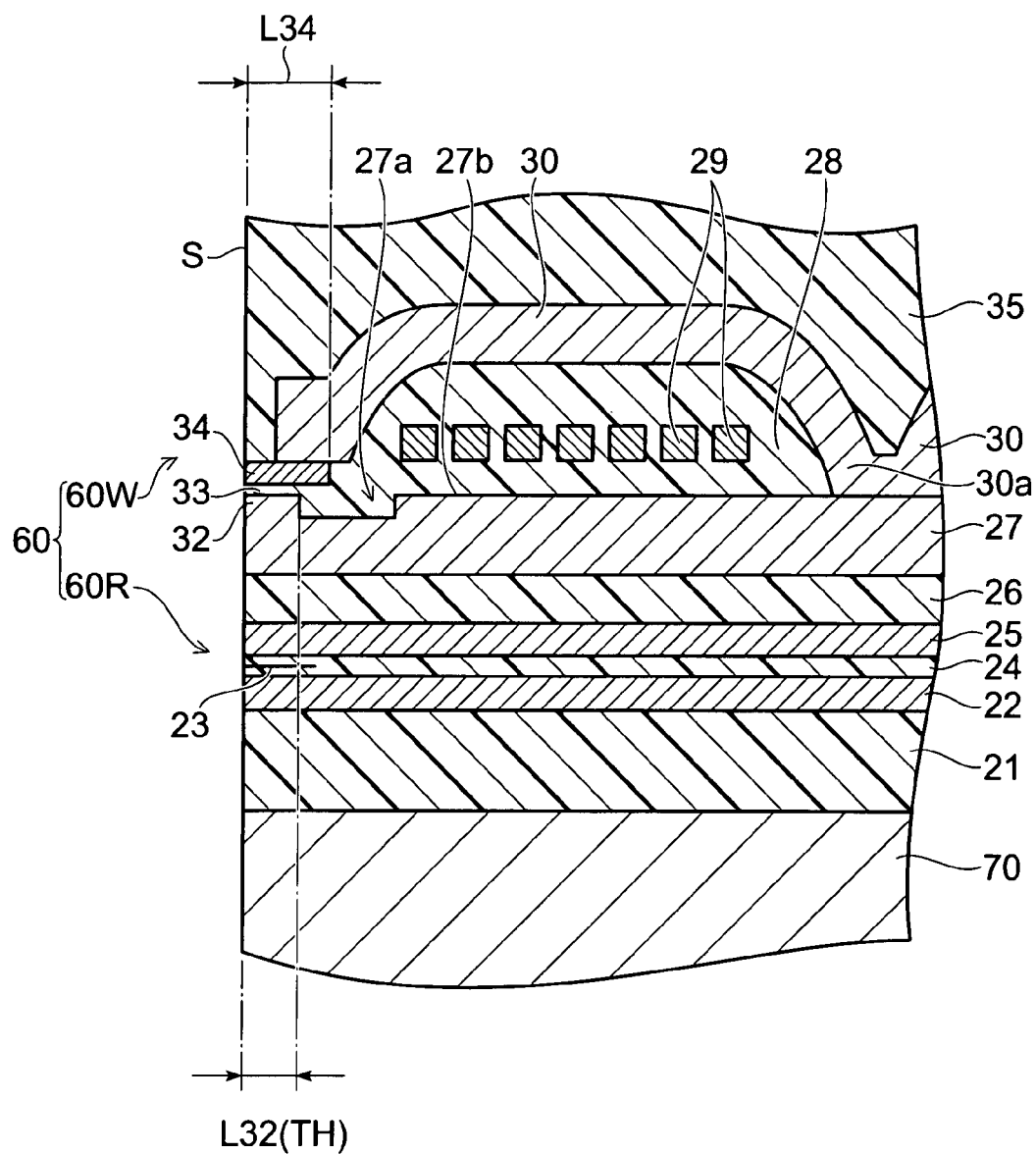
FIG. 3 is a sectional view of a thin-film magnetic head 60 and its vicinity taken along a direction perpendicular to both of a medium-opposing surface S and a track width.

The structure of the thin-film magnetic heads 60 will now be explained in detail. FIG. 3 is a sectional view of the thin-film magnetic head 60 and its vicinity taken along a direction perpendicular to both of the medium-opposing surface S and track width.

An electrically insulating material such as $Al_2O_3$ or $SiO_2$ is sputtered and so forth onto a substrate 70 made of a ceramic material such as $Al_2O_3$—TiC, so as to form an undercoat film 21, on which a soft magnetic alloy material such as NiFe (permalloy) is plated and so forth, whereby a lower shield layer 22 is formed.

On the lower shield layer 22, an MR device 23 such as GMR (Giant Magneto Resistive) device or TMR (Tunnel Magneto Resistive) device, for example, is formed such as to be held between the lower shield layer 22 and an insulating film 24 formed by sputtering $Al_2O_3$ or the like. Namely, the MR device 23 is formed by laminating and patterning an MR multilayer body or the like on a lower insulating film (not depicted) constituting the lower side of the insulating film 24 formed on the lower shield layer 22.

The MR device 23 is formed with a lead (not depicted) made of Cu or the like by plating or the like, while a hard bias layer and the like for applying a bias to the MR device 23 are formed on both sides in the track width direction as necessary. $Al_2O_3$ or the like is sputtered on the MR device 23, lead, and lower insulating film, so as to form an upper insulating film (not depicted), whereby the lower and upper insulating films construct the above-mentioned insulating film 24.

A soft magnetic alloy material such as NiFe (permalloy) is plated and so forth on the insulating film 24, whereby an upper shield layer 25 is formed.

The lower shield layer 22, MR device 23, lead, insulating film 24, and upper shield layer 25 constitute the reader 60R.

$Al_2O_3$, Pt, or the like is sputtered on the upper shield layer 25, so as to form a nonmagnetic film 26.

A soft magnetic alloy material such as NiFe (permalloy) is plated and so forth on the nonmagnetic film 26, so as to form a lower magnetic pole layer 27, on which a coil conductor 29 made of Cu or the like is provided so as to be held within an insulating layer 28 made of a resist material, $Al_2O_3$, or the like. A soft magnetic alloy material such as NiFe alloy is further plated thereon, whereby a yoke layer 30 is formed.

On the medium-opposing surface S side, a write gap layer 33 is formed by sputtering $Al_2O_3$, $SiO_2$, or the like and so forth, on which a soft magnetic alloy material such as NiFe (permalloy) is plated and so forth, whereby an upper magnetic pole 34 is formed.

Figure 4:
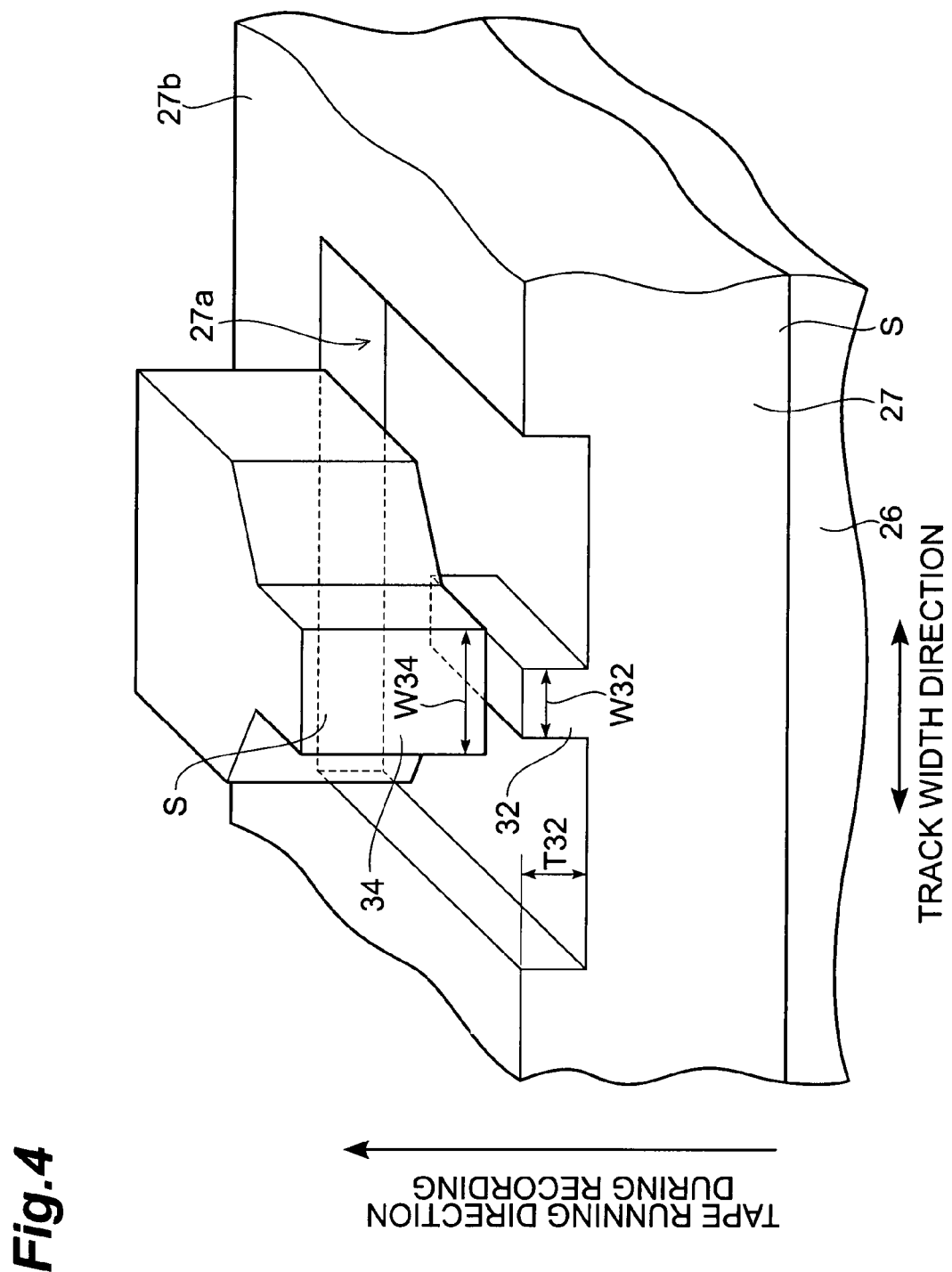
FIG. 4 is a perspective view for explaining a lower magnetic pole layer and an upper magnetic pole in the thin-film magnetic head.

The upper face of the upper magnetic pole 34 is magnetically coupled to the yoke layer 30. As shown in FIG. 4 and the like, the upper magnetic pole 34 is formed such that its width W34 in the track width direction in the medium-opposing surface S is narrower than that at a position remote from the medium-opposing surface S when seen in a direction orthogonal to the track width direction and parallel to the medium-opposing surface S (see FIG. 5). The width W34 of the upper magnetic pole 34 in the medium-opposing surface S may be 2 to 20 µm, for example. The length L34 (see FIG. 5) of the upper magnetic pole 34 in a direction orthogonal to the medium-opposing surface S may be 1.0 to 5.0 µm, for example.

As shown in FIG. 3, the lower magnetic pole layer 27 is in contact with a coupling part 30a of the yoke layer 30 on the side remote from the medium-opposing surface S, whereby they are magnetically coupled to each other.

The coil conductor 29 is formed so as to be spirally wound about the coupling part 30a of the yoke layer 30 with respect to the lower magnetic pole layer 27.

In particular, as shown in FIG. 4, a lower magnetic pole projection 32 projecting toward the upper magnetic pole 34 is formed on the upper face of the lower magnetic pole layer 27 on the medium-opposing surface S side in this embodiment. The surface height of a substantially U-shaped area 27a surrounding the lower magnetic pole projection 32 and including parts adjacent to the lower magnetic pole projection 32 on both sides in the track width direction and a part adjacent to the lower magnetic pole projection 32 on the side opposite from the medium-opposing surface S is made lower than the surface height of the lower magnetic pole projection 32 and the surface height of an outer part 27b on the outer side of this area 27a, whereby the lower magnetic pole projection 32 is formed.

Figure 5:
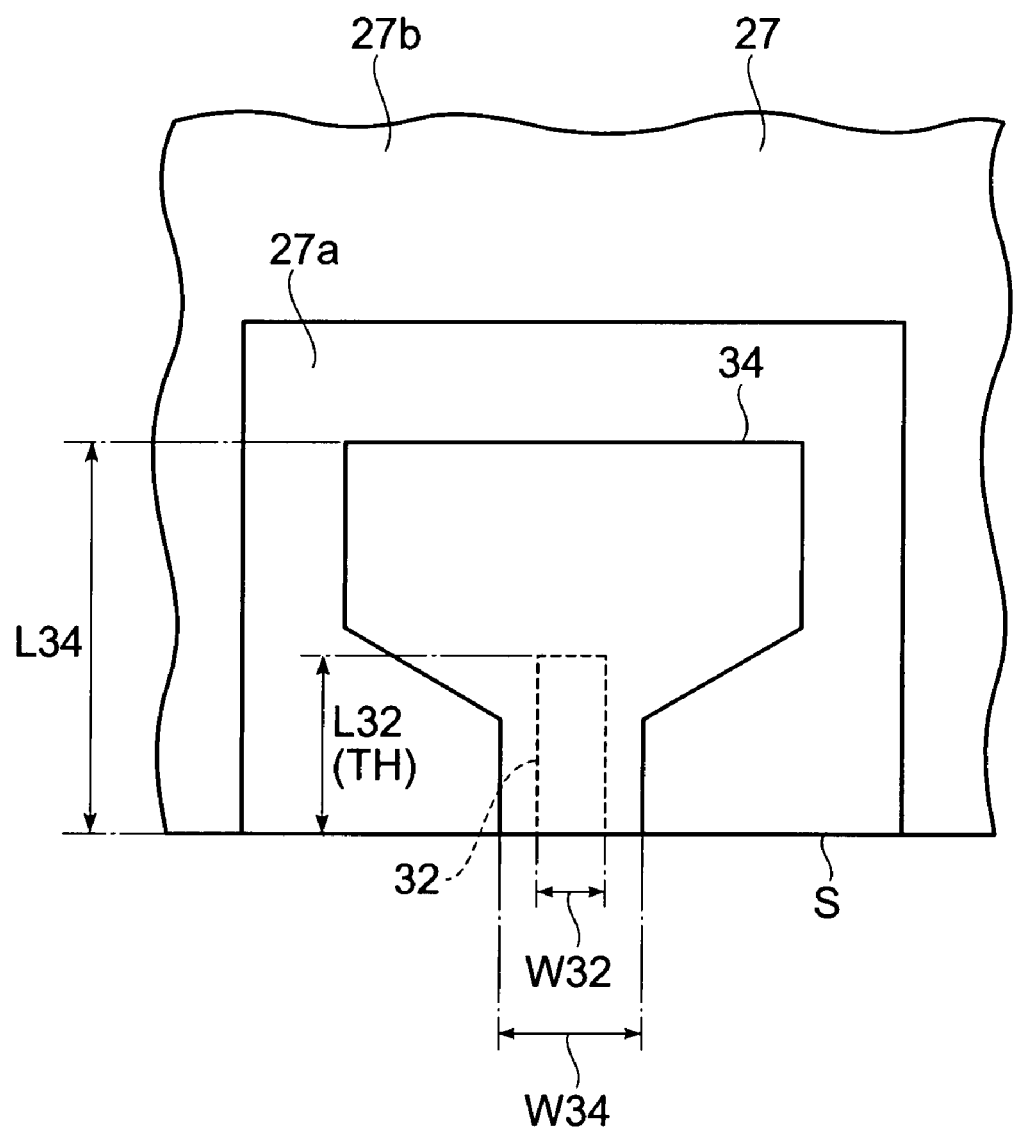
FIG. 5 is a conceptual view showing FIG. 4 as seen in a direction perpendicular to the track width direction and parallel to the medium-opposing surface S.

Here, the lower magnetic pole projection 32 is arranged so as to oppose the upper magnetic pole 34. The surface of the outer part 27b on the outer side of the lower magnetic pole projection 32 is flush with the surface of the lower magnetic pole projection 32. The lower magnetic pole projection 32 has a substantially rectangular form when seen in the direction orthogonal to the track width and parallel to the medium-opposing surface S (see FIG. 5). The width W32 of the lower magnetic pole projection 32 in the track width direction is preferably smaller than the width W34 of the upper magnetic pole 34 in the track width direction, and may be 1 to 19.8 µm, for example. As shown in FIG. 5, the length L32 of the lower magnetic pole projection 32 in a direction orthogonal to the medium-opposing surface S is made shorter than the length W34 of the upper magnetic pole 34 in the direction orthogonal to the medium-opposing surface S. Preferably, the length L32 of the lower magnetic pole projection 32 extends to a position farther from the medium-opposing surface S than is a flare point of the upper magnetic pole 34, i.e., point at which the width W34 begins to expand in FIG. 5.

In such a structure, the throat height TH is defined by the length L32 of the lower magnetic pole projection 32 (see FIG. 3 and the like). The distance between the upper magnetic pole 34 and lower magnetic pole projection 32 may be 0.05 to 0.50 µm, for example.

The thickness of the lower magnetic pole layer 27 may be 0.5 to 5 µm, for example, while the projection length T32 (see FIG. 4) of the lower magnetic pole projection 32, i.e., thickness T32 of the area 27a, may be 0.1 to 1.0 µm, for example. In the surface of the depressed area 27a, the parts adjacent to the lower magnetic pole projection 32 on both sides in the track width direction and the part adjacent to the lower magnetic pole projection 32 on the side opposite from the medium-opposing surface are made flush with each other without a difference in height therebetween. The lower magnetic pole projection 32 and the lower magnetic pole layer 27 directly under the lower magnetic pole projection 32 are integrated with each other without an interface.

Returning to FIG. 3, a protective film 35 is formed on the yoke layer 30 by sputtering $Al_2O_3$, $SiO_2$, or the like, and so forth.

It is clear that the lower magnetic pole layer 27 may be constructed so as to function as the upper shield layer 25 as well. In this case, the nonmagnetic film 26 is omitted as a matter of course.

A method of manufacturing such a thin-film magnetic head, the lower magnetic pole projection 32 in particular, will now be explained in detail.

Figure 6:
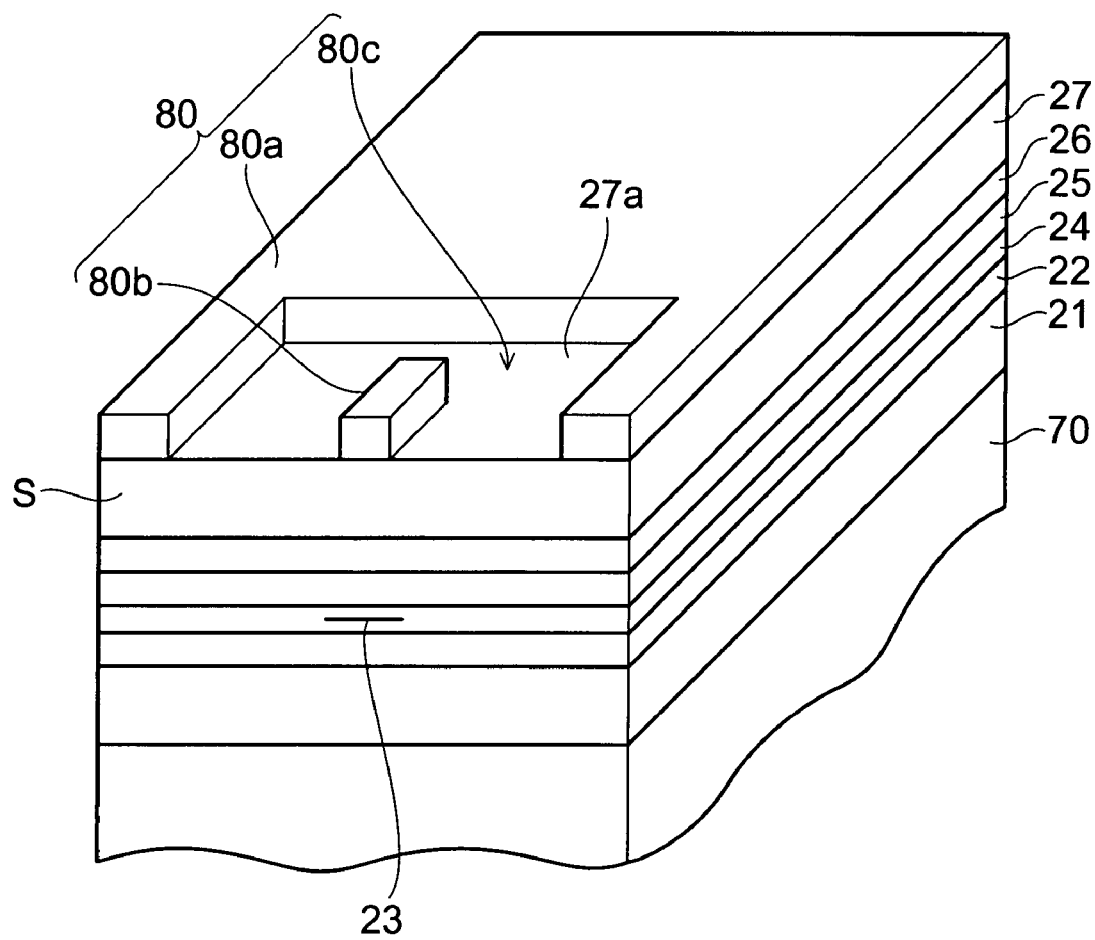
FIG. 6 is a perspective view showing a method of manufacturing the thin-film magnetic head.

First, as shown in FIG. 6, the undercoat film 21, lower shield layer 22, MR device 23, insulating film 24, upper shield layer 25, and nonmagnetic film 26 are formed by a known method on the substrate 70 made of $Al_2O_3$—TiC or the like. Thereafter, by plating or the like, the lower magnetic pole layer 27 made of permalloy or the like is formed on the nonmagnetic film 26.

Subsequently, a resist mask 80 is formed on the lower magnetic pole layer 27. Here, the resist mask 80 has an uncovered part 80c exposing a part corresponding to the area 27a to be etched, a covered part 80a covering the outer side of the uncovered part 80c, and a bar-shaped covered part 80b covering a part corresponding to the lower magnetic pole projection 32.

Figure 7:
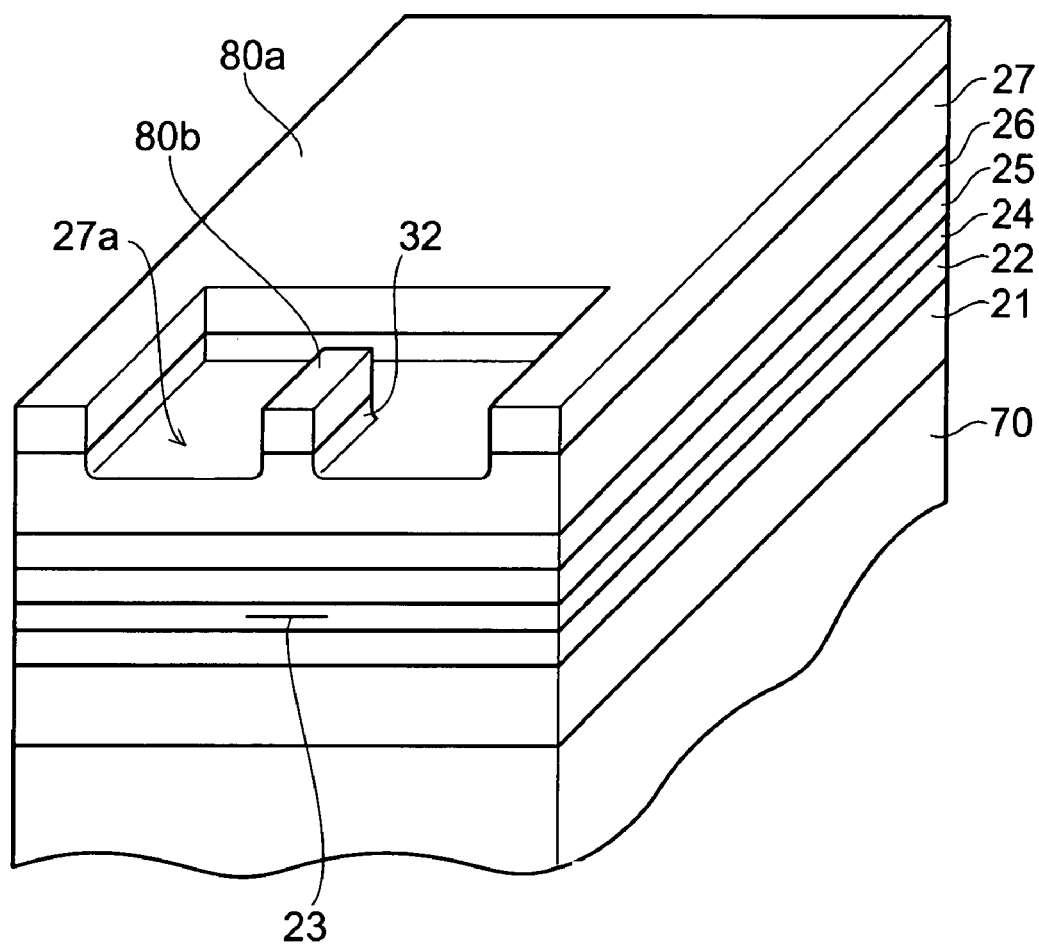
FIG. 7 is a perspective view, subsequent to FIG. 6, showing the method of manufacturing the thin-film magnetic head.

Next, as shown in FIG. 7, the lower magnetic pole layer 27 is etched by physical etching such as ion milling and the like or chemical etching using an acid and the like while employing the resist mask 80 as a mask, so as to eliminate a predetermined thickness of the area 27a of the lower magnetic pole layer 27 exposed from the uncovered part 80c, thereby forming a depressed part. This forms the lower magnetic pole projection 32. Namely, parts adjacent to the part to become the lower magnetic pole projection 32 on both sides in the track width direction and a part adjacent to the part to become the lower magnetic pole projection 32 on the side opposite from the medium-opposing surface are etched at the same time.

Figure 8:
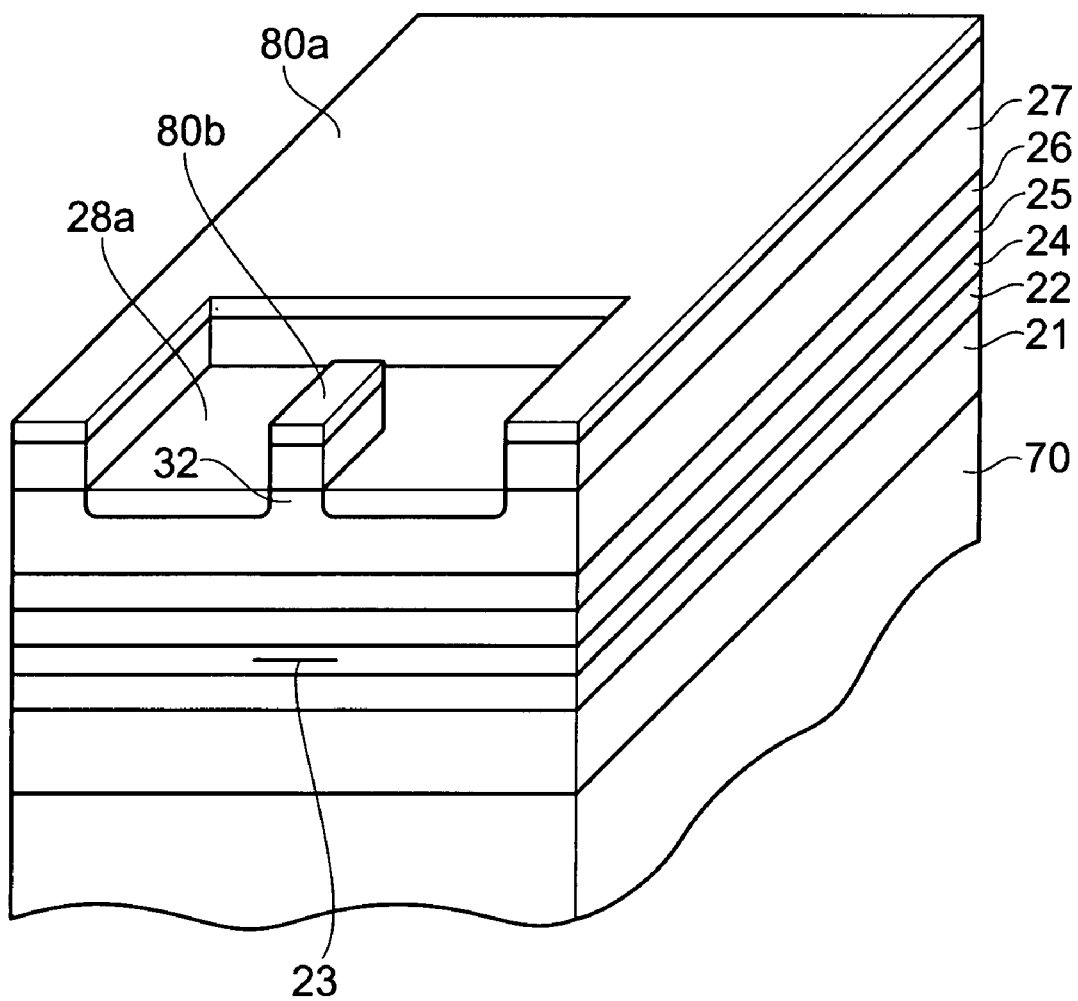
FIG. 8 is a perspective view, subsequent to FIG. 7, showing the method of manufacturing the thin-film magnetic head.

Subsequently, as shown in FIG. 8, a nonmagnetic insulating material such as alumina is laminated by sputtering or the like, so as to form an insulating layer 28a to become a part of the insulating layer 28 within the depressed area 27a, and then the resists 80a, 80b are peeled off.

Figure 9:
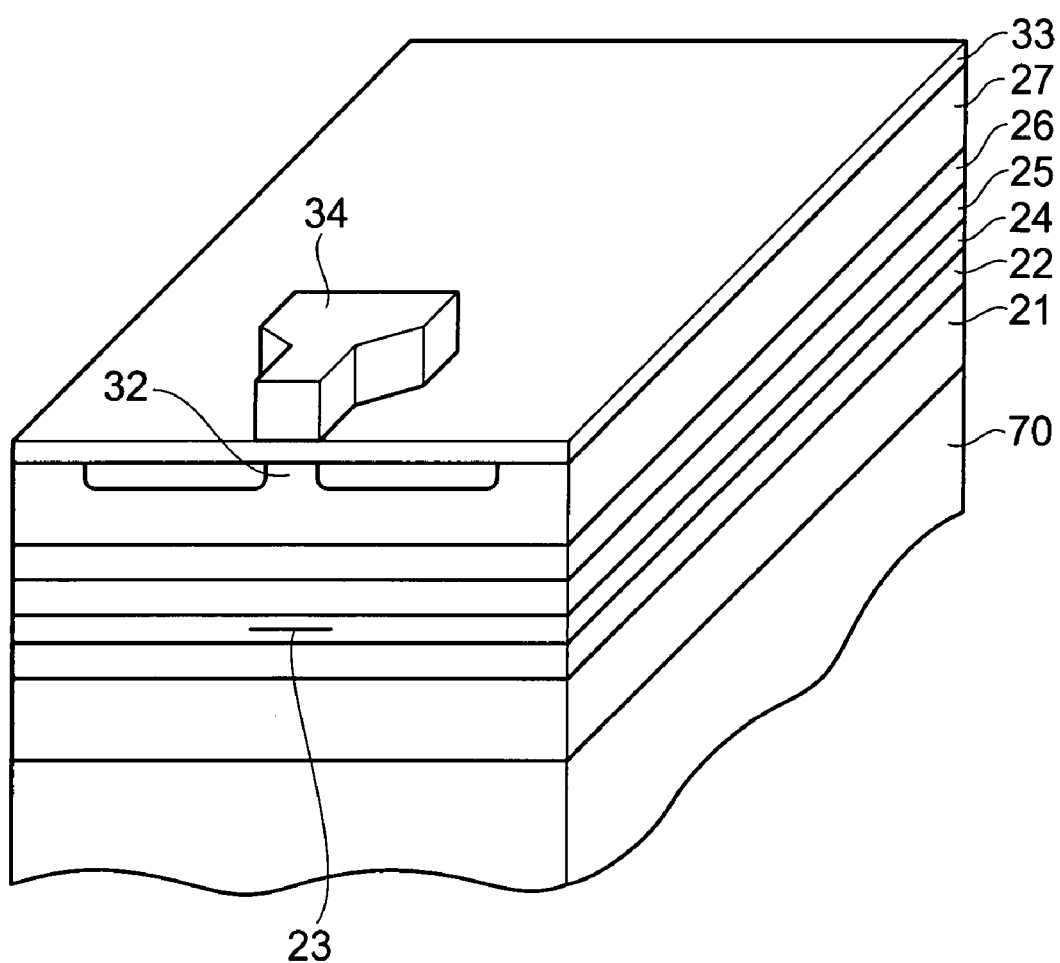
FIG. 9 is a perspective view, subsequent to FIG. 8, showing the method of manufacturing the thin-film magnetic head.

Next, as shown in FIG. 9, the gap layer 33 is formed on the insulating layer 28a filling the area 27a and the lower magnetic pole layer 27. Then, the upper magnetic pole 34 is formed from permalloy or the like by patterning on the area 27a. Thereafter, the remainder of insulating layer 28, the coil conductor 29, the yoke layer 30, and the like are formed by a known method, and the substrate as a whole is lapped, so as to form the medium-opposing surface S.

Since both end faces of the lower magnetic pole projection 32 in the track width direction and the surface on the side opposite from the medium-opposing surface can be formed by a single etching operation, the number of steps can be made smaller in the present invention than in the prior art. This can cut the cost down. Also, the width W34 of the upper magnetic pole 34 in the track width direction and the width W32 of the lower magnetic pole 32 in the track width direction can easily be made different from each other.

Since the width W32 of the lower magnetic pole projection 32, which becomes the leading side when writing information onto the tape TP, in the track width direction in the medium-opposing surface S is made smaller than the width W34 of the upper magnetic pole 34, which becomes the trailing side when writing information, in the track width direction in the medium-opposing surface S as shown in FIG. 4, this embodiment is effective in particular in that fringing magnetic fields protruding from side parts of the upper magnetic pole 34 can be reduced, whereby writing performances can be improved.

If the parts adjacent to the part to become the lower magnetic pole projection 32 on both sides in the track width direction and the part adjacent to the part to become the lower magnetic pole projection 32 on the side opposite from the medium-opposing surface are etched separately from each other, a minute difference in height will occur therebetween. If the lower magnetic pole projection 32 is formed by plating or the like instead of etching, an interface will be formed between the lower magnetic pole projection 32 and the lower magnetic pole layer 27 directly thereunder.

Without being restricted to the example mentioned above, the present invention can be modified in various ways in the structure thereof as a matter of course.

Figure 10:
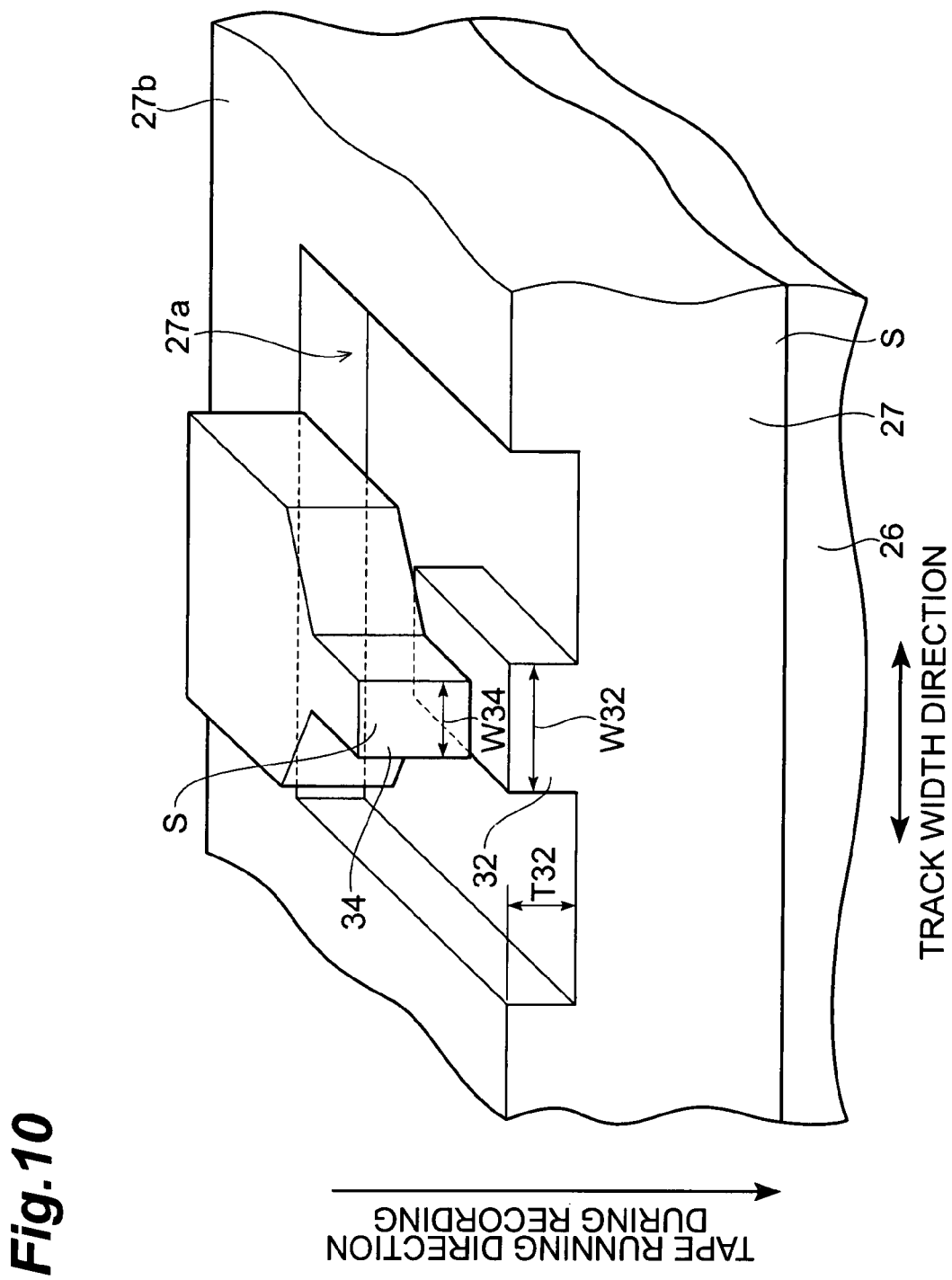
FIG. 10 is a perspective view for explaining the lower magnetic pole layer and upper magnetic pole concerning another embodiment of the thin-film magnetic head.

When the upper magnetic pole 34 and lower magnetic pole projection 32 become the leading and trailing sides, respectively, at the time of writing information onto the tape TP as shown in FIG. 10 unlike FIG. 4 in which the upper magnetic pole 34 and lower magnetic pole projection 32 become the trailing and leading sides, respectively, at the time of writing information onto the tape TP, it will be preferred if the width W32 of the lower magnetic pole projection 32 in the track width direction in the medium-opposing surface S is made greater than the width W34 of the upper magnetic pole 34 in the track width direction in the medium-opposing surface S. This is effective in that fringing magnetic fields protruding from side parts of the upper magnetic pole can be reduced, whereby writing performances can be improved.

No matter which direction the tape runs at the time of recording, it will be preferred if the width W32 of the lower magnetic pole projection 32 in the track width direction is not more than the length L32 of the lower magnetic pole projection 32 in the direction orthogonal to the medium-opposing surface S (see FIG. 5). The present invention can also be carried out when W34=W32.

Figure 11:
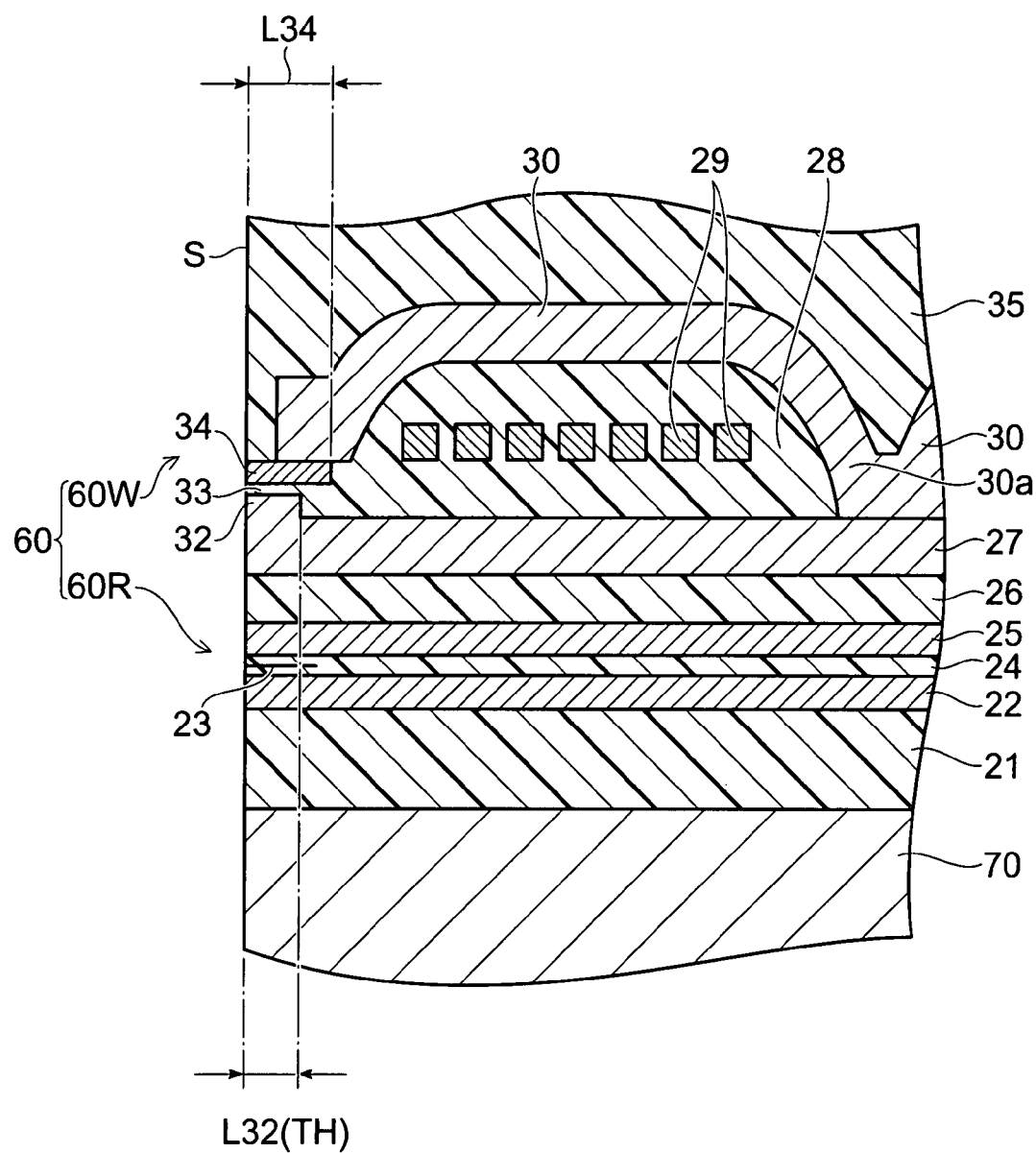
FIG. 11 is a sectional view showing still another embodiment of the thin-film magnetic head taken along a direction perpendicular to both of the medium-opposing surface S and track width.
Figure 12:
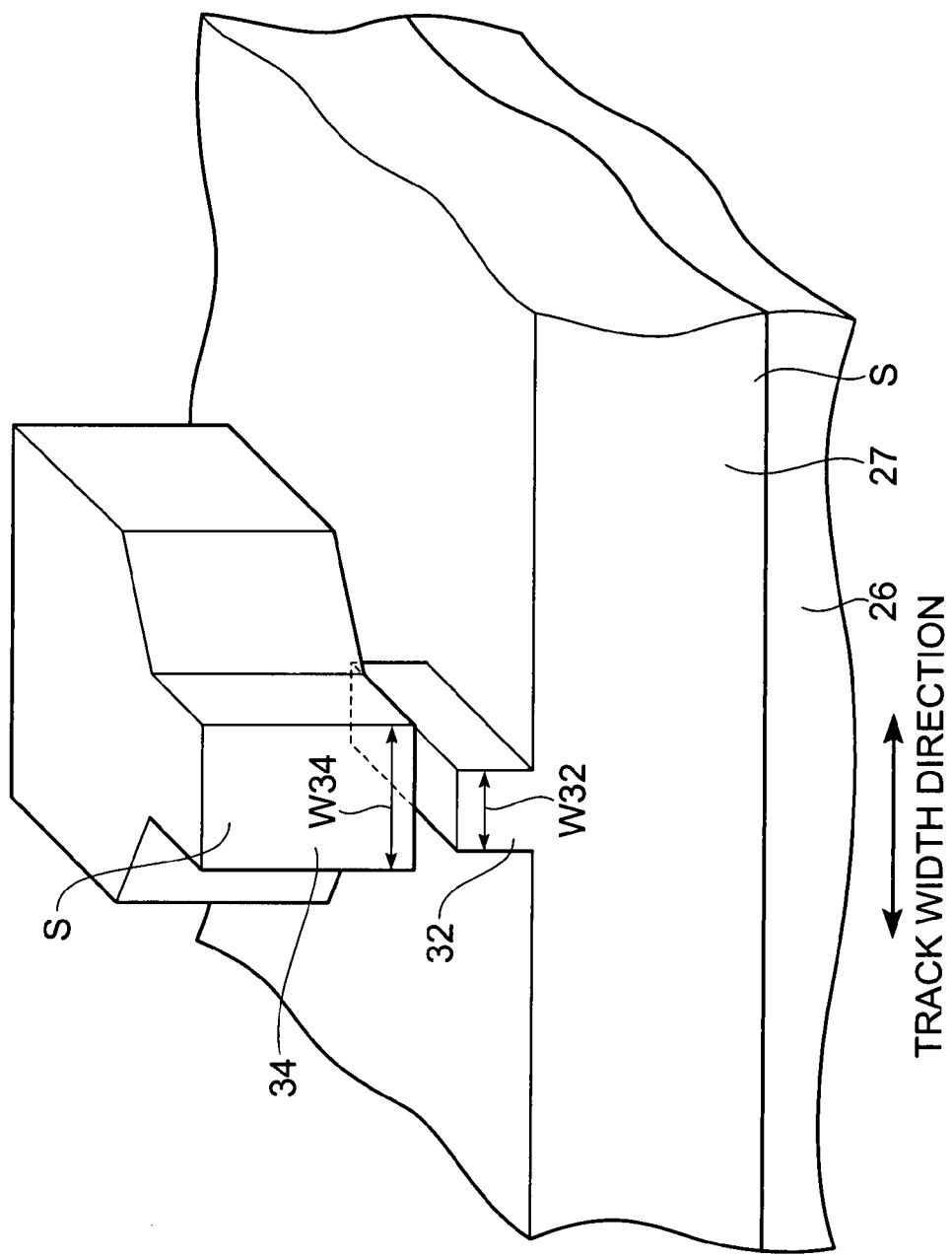
FIG. 12 is a perspective view for explaining the lower magnetic pole layer and upper magnetic pole of the thin-film magnetic head in FIG. 11.

Without being restricted to the above-mentioned embodiment in which the depressed area 27a is formed about the lower magnetic pole projection 32 while the outer part 27b made higher than the area 27a is formed on the outer side of the area 27a in the above-mentioned embodiment as shown in FIGS. 3 and 4, the etching about the lower magnetic pole projection 32 may be conducted more widely, so as to yield a state forming no projection about the lower magnetic pole projection 32 as shown in FIGS. 11 and 12.

Without being restricted to the rectangular form as seen from thereabove as shown in FIG. 5, the lower magnetic pole projection 32 may have such a form that a part remote from the medium is expanded as with the upper magnetic pole 34, for example.

The present invention is not limited to thin-film magnetic heads for linear tape drives, but may also be a thin-film magnetic head for other devices such as hard disk drives, and can be a thin-film magnetic head without the readers 60R.

What is claimed is:

1. A method of manufacturing a thin-film magnetic head, the method comprising:
    a lower magnetic pole layer forming step of forming a lower magnetic pole layer;
    a lower magnetic pole projection forming step of forming the lower magnetic pole layer with a lower magnetic pole projection;
    a gap layer forming step of laminating a nonmagnetic gap layer on the lower magnetic pole projection; and
    an upper magnetic pole forming step of forming an upper magnetic pole on the nonmagnetic gap layer;
    wherein the lower magnetic pole projection forming step forms the lower magnetic pole projection by simultaneously etching a plurality of parts of an area in a surface of the lower magnetic pole layer, the plurality of parts of the area including two parts respectively adjacent to two opposing sides, in a track width direction, of a projection forming part of the surface of the lower magnetic pole layer that is to become the lower magnetic pole projection, and a part that is adjacent to the projection forming part and is on a side of the projection forming part opposite from a medium-opposing surface of the lower magnetic pole layer.

2. A method of manufacturing a thin-film magnetic head according to claim 1, wherein, in the upper magnetic pole forming step, a length of the upper magnetic pole in a direction orthogonal to the medium-opposing surface is made greater than a length of the lower magnetic pole projection in the direction orthogonal to the medium-opposing surface.

3. A method of manufacturing a thin-film magnetic head according to claim 1, wherein a width in the track width direction in the medium-opposing surface of the upper magnetic pole formed in the upper magnetic pole forming step is made different from a width of the lower magnetic pole projection in the track width direction in the medium-opposing surface.

* * * * *